United States Patent
Zumsteg et al.

(10) Patent No.: US 11,583,946 B2
(45) Date of Patent: Feb. 21, 2023

(54) MACHINE REAMING TOOL, CUTTING INSERT AND BASE BODY FOR RECEIVING CUTTING INSERTS

(71) Applicant: Urma AG Werkzeugfabrik, Rupperswil (CH)

(72) Inventors: Gilbert Zumsteg, Rupperswil (CH); Daniel Berger, Rupperswil (CH)

(73) Assignee: URMA AG WERKZEUGFABRIK, Rupperswil (CH)

( * ) Notice: Subject to any disclaimer, the term of this patent is extended or adjusted under 35 U.S.C. 154(b) by 0 days.

(21) Appl. No.: 17/122,393

(22) Filed: Dec. 15, 2020

(65) Prior Publication Data

US 2021/0187641 A1   Jun. 24, 2021

(30) Foreign Application Priority Data

Dec. 20, 2019   (CH) ..................... 01688/19

(51) Int. Cl.
```
B23D 77/02      (2006.01)
B23D 77/00      (2006.01)
B23D 77/04      (2006.01)
```

(52) U.S. Cl.
CPC ......... *B23D 77/025* (2013.01); *B23D 77/006* (2013.01); *B23D 77/044* (2013.01); *B23D 2277/088* (2013.01); *Y10T 408/8598* (2015.01)

(58) Field of Classification Search
CPC ... B23C 5/28; B23C 2240/245; B23C 5/2204; B23D 2277/088; B23D 77/025; B23D 77/006; B23D 77/044; B23B 2205/12; Y10T 408/8598
See application file for complete search history.

(56) References Cited

U.S. PATENT DOCUMENTS

| | | | |
|---|---|---|---|
| 2,278,988 A | 4/1942 | Groene | |
| 2,517,970 A | 8/1950 | Buchanan | |
| 9,434,011 B2* | 9/2016 | Morrison et al. | B23C 5/28 |
| | | | 407/11 |
| 2004/0161311 A1* | 8/2004 | Satran et al. | B23C 5/22 |
| 2011/0097165 A1* | 4/2011 | Choi et al. | B23C 5/22 |

FOREIGN PATENT DOCUMENTS

| | | |
|---|---|---|
| DE | 385524 | 11/1923 |
| DE | 10 2007 007 399 | 8/2008 |
| EP | 1 750 881 | 2/2007 |
| GB | 172796 | 12/1921 |

OTHER PUBLICATIONS

Switzerland Search Report dated May 19, 2020, 16882019, 4 pages.

* cited by examiner

*Primary Examiner* — Boyer D Ashley
*Assistant Examiner* — Reinaldo A Vargas Del Rio
(74) *Attorney, Agent, or Firm* — Rankin, Hill & Clark LLP

(57) ABSTRACT

A machine reaming tool includes a base body with a plurality of insert receivers with cutting inserts that are inserted therein. The cutting inserts are inserted into insert receivers that each form a linear guide of the cutting inserts in a direction orthogonal to a rotation axis of the machine reaming tool. The linear guide is a prismatic sliding guide such as a dovetail guide. In particular, the dovetail guide is designed asymmetrically.

15 Claims, 3 Drawing Sheets

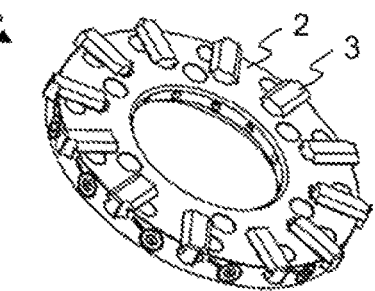
Fig. 1
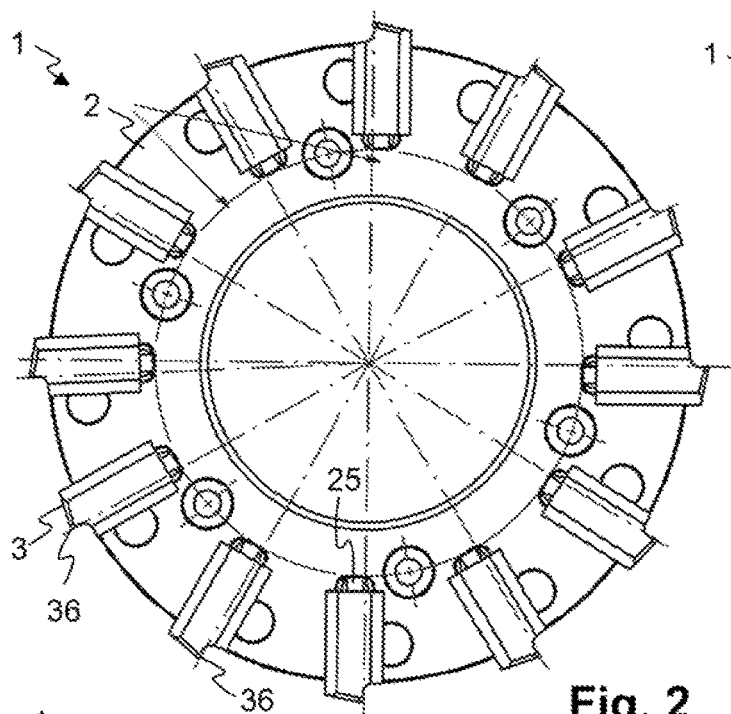
Fig. 2
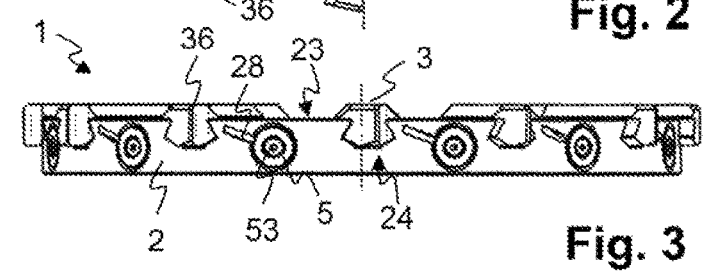
Fig. 3
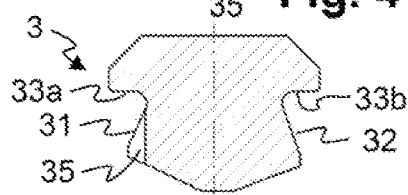
Fig. 4
Fig. 5
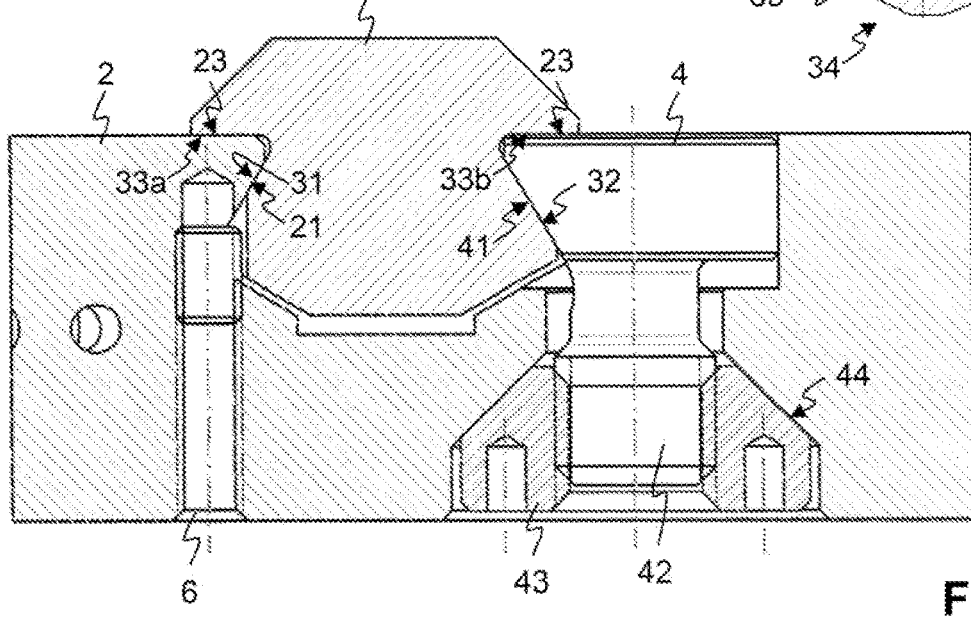
Fig. 6

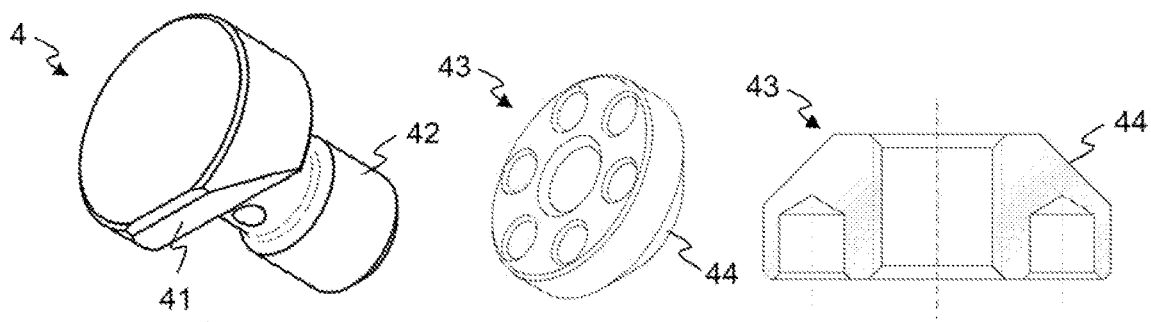
Fig. 7   Fig. 8   Fig. 9
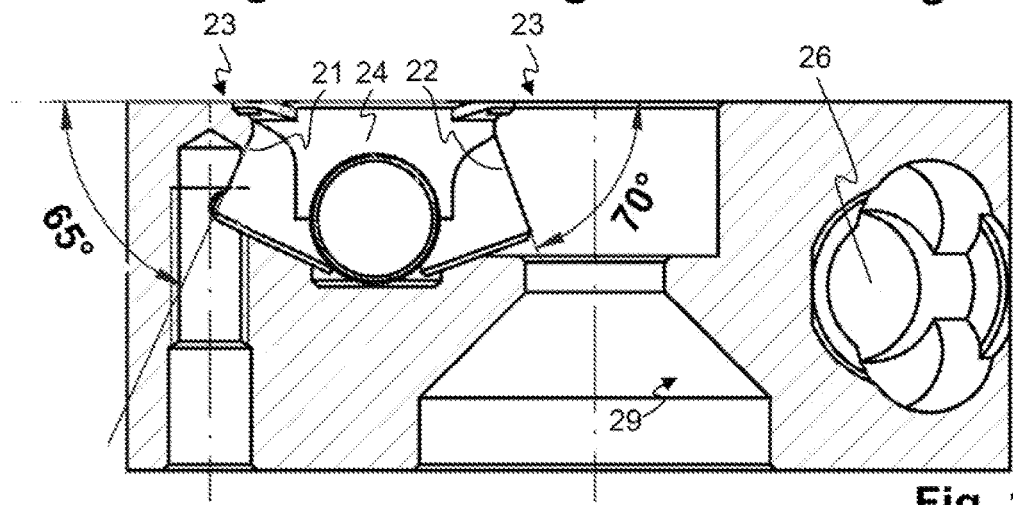
Fig. 10
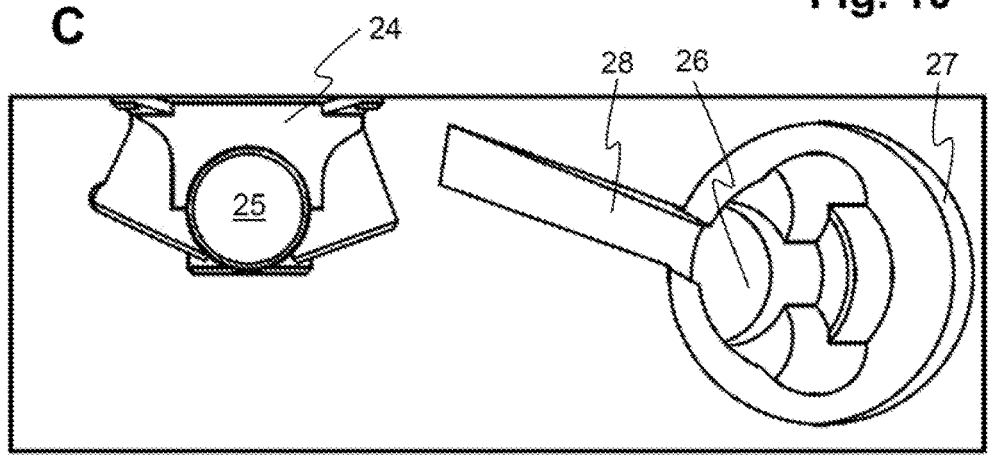
Fig. 11
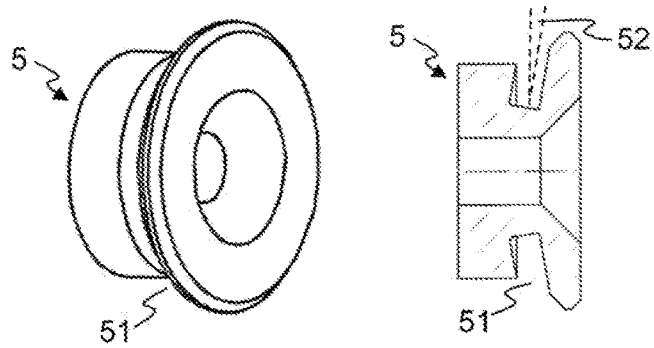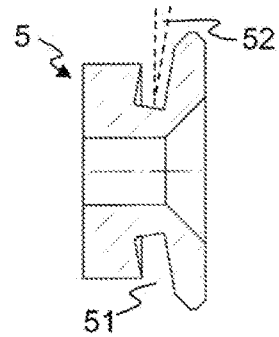
Fig. 12   Fig. 13

MACHINE REAMING TOOL, CUTTING INSERT AND BASE BODY FOR RECEIVING CUTTING INSERTS

BACKGROUND OF THE INVENTION

Field of the Invention

The invention relates to the field of reaming tools for machining bores in different materials, in particular metal, plastics, fibre composite materials, etc. In particular, it relates to a machine reaming tool, a cutting insert and a base body for receiving cutting inserts.

Description of Related Art

Machine reaming tools or machine reamers are used for the fine machining of cylindrical bores in metal parts by way of so-called "reaming". Herein, what is improved is the surface quality as well as the shape and dimensionally accuracy, roundness and cylindricity. Firstly, a bore is created, said bore being a few tenths of a millimetre (mostly 0.1-0.2 mm) smaller than a nominal dimension. The bore is subsequently brought to the nominal dimension with the help of the reaming tool. Smaller tolerances can be manufactured in this manner. The dimensional tolerance which can be achieved in the normal case is IT7. In special cases, IT6 or even IT5 are also possible.

Individual cutting edges of a reaming tool each include a primary cutting edge or a leading cut portion and a secondary cutting edge or guide portion. The leading cut portion performs the material-removing work and the guide portion serves for guiding the tool in the bore. In order to ensure a reliable guidance under all machining conditions, for example in the case of an oblique exit out of the bore, the guide portion is a multiple of the length of the leading cut portion in the axial direction. The length of the guide portion is therefore 10 millimetres or more, given a diameter for example of approx. 15 millimetres. The guide portion runs parallel to the rotation axis of the tool in the case of a straight fluted cutter (insert). In case of a helically fluted cutter, the guide portion runs obliquely to the rotation axis of the tool.

It is known to equip base bodies with exchangeable cutting bodies of carbide, by way of the cutting body being clamped, soldered or screwed into a holder of the base body and subsequently grinding the cutting surfaces of the cutting bodies to a desired diameter dimension. This however is cumbersome, since in each case, starting from a certain desired dimension, this procedure must be carried out. If the cutting bodies are removed from the base body and attached anew, then as a rule they must be inserted again at precisely the same location, or must be ground afresh.

U.S. Pat. No. 2,517,970 shows a reaming tool with exchangeable blades. The blades are each inserted into a shank by way of a radially running sliding guide with oblique grooves. One does not envisage the tool being set to different diameters.

DE 10 2007 007399 A1 shows a machine reamer with a tool holder and a cutter block which is movably guided in the tool holder transversely to its longitudinal axis. Herewith, the cutting elements together with the cutter block can execute a pendulating movement about the longitudinal axis, in order to compensate an offset between the bore and the tool.

GB 172 796 shows a reaming tool with radial adjustable cutting elements. Each cutting element is guided in a radially running slot. The cutting elements are commonly radially displaced by way of a cone and are set to a diameter. The precision of the guidance in the slots is limited inherently of the design.

SUMMARY OF THE INVENTION

A possible object of the invention is to provide a machine reaming tool, a cutting insert and a base body for receiving cutting inserts of the initially mentioned type, which overcome the aforementioned disadvantages.

A further possible object of the invention is to provide a machine reaming tool, a cutting insert and a base body for receiving cutting inserts, which permit a precise and adjustable holding of the cutting inserts in the base body.

A further possible object is to provide a machine reaming tool, a cutting insert and a base body for receiving cutting inserts, which permit a rapid provision of a reaming tool for a predefined dimension.

At least one of these objects is achieved by a machine reaming tool, a cutting insert and a base body for receiving cutting inserts, with the features of the respective independent patent claims.

The machine reaming tool includes a base body with a plurality of insert receivers with cutting inserts, which are inserted therein. Herein, the cutting inserts are inserted into insert receivers, which each form a linear guide (or straight guide) of the cutting inserts in a direction orthogonal to a rotation axis of the machine reaming tool.

In embodiments, the cutting inserts are each positionable and fixable in a selectable position along the respective linear guide, in particular by way of a clamping body. Herewith, the radial position of the cutting inserts can be set and/or adjusted.

By way of this, it is possible to position and fix the cutting inserts in a defined position along the linear guide, without the cutting inserts having to be ground afterwards.

In embodiments, a central longitudinal axis of the linear guide, in particular an axis along which the cutting edge displaces on displacing the cutting inset, intersects the rotation axis of the machine reaming tool. In other embodiments, this is not the case.

In embodiments, the linear guide is a prismatic sliding guide. In particular, it can be a dovetail guide, wherein the cutting insert includes a dovetail section with a first guide surface and with a second guide surface which interacting with a first receiving surface and a second receiving surface of the base body define the dovetail guide.

By way of this, a precise guiding of the cutting inserts in the base body is possible.

In embodiments, the linear guide is a cylindrical sliding guide. Herein, the base body can include a rotationally cylindrical receiver with an inner surface, and the cutting insert can be designed as a prism, wherein two edges of the prism bear on the inner surface in the assembled state of the cutting insert.

In embodiments, the dovetail guide is designed asymmetrically, in particular by way of an angle between the first guide surface with respect to a reference plane which runs orthogonally to the rotation axis of the machine reaming tool differing from the angle between the second guide surface and the reference plane, in particular by at least 3° or at least 5°.

By way of this, it is possible to at least partly compensate an asymmetry of forces that result on clamping in the cutting insert at only one side of the cutting insert. In turn, by way of this, the precision of the contact of the cutting insert on the base body is increased.

In embodiments, the angle between the first guide surface with respect to the reference plane is 65°, and the angle between the second guide surface and the reference plane is 70°.

In embodiments, it is the case that
the machine reaming tool includes a clamping body that interacts with the second receiving surface and herein exerts a force that presses the first guide surface against the first receiving surface,
and in particular this force also presses a first and a second reference surface of the cutting inset against a reference surface of the base body,
wherein in particular these reference surfaces lie orthogonally to the rotation axis of the machine reaming tool.

By way of this, it becomes possible to press the two reference surfaces of the cutting inset that lie opposite one another with respect to the dovetail section, against the corresponding reference surface of the base body by way of a single clamping element.

In embodiments, it is the case that the clamping body and the second receiving surface lead with respect to the cutting insert seen in the rotation direction on use of the machine reaming tool.

By way of this, it becomes possible for machining forces that act upon the cutting insert counter to the rotation direction to be transmitted predominantly by the first guide surface onto the first receiving surface. By way of this, a greater plane surface for force transmission is available than at the second receiving surface, which is interrupted by a section in which the clamping body is located.

In embodiments, the machine reaming tool includes a clamping nut that, interacting with a threaded section of the clamping body, exerts the force that presses the first receiving surface against the first guide surface, wherein the clamping nut includes a cone section, and with this cone section is arranged in a conical seat of the base body.

By way of this, it is possible to ensure the mechanical strength of the base body in the region of the insert receiver, without the thickness of the base body having to be enlarged in the axial direction.

In other embodiments, the clamping nut includes a straight contact surface on a plane seat in the base body.

In embodiments, an insert receiver each includes a stop unit that effects an adjustable limitation of the movement of the cutting insert, which is inserted into the insert receiver, in the direction of the linear guide.

In embodiments, the stop unit includes an adjusting screw that is adjustable in the direction of the linear guide.

In embodiments, the adjusting screw permits the adjustment of the position of the cutting insert in the range of up to ten millimetres, in particular up to six millimetres.

By way of this, it is possible to set and/or adjust the radial position of the respective cutting insert.

In embodiments, the base body has an outer diameter of between 120 and 300 millimetres.

In embodiments, the machine reaming tool includes six to twenty, in particular twelve to eighteen cutting inserts that are distributed along the periphery of the base body.

By way of this, it is possible to cover a wide range of diameters with a single set of cutting inserts. The cutting inserts can be manufactured and ground in a precise manner. For applications with a certain cutting dimension, the cutting inserts can be inserted into a base body with a corresponding diameter, and the cutting dimension set.

The cutting insert is provided for use in a machine reaming tool, and includes a cutting edge for reaming a workpiece, as well as a dovetail section for the linear guiding of the cutting insert by way of a dovetail guide.

The cutting edge typically includes a leading cut portion and a guide portion. The leading cut portion serves for the material-removing machining of a workpiece; the guide portion for guiding the workpiece.

In embodiments, the dovetail section is designed asymmetrically.

In embodiments, the dovetail section is designed asymmetrically, by way of
the cutting insert extending in a guide direction, and being provided for inserting along the guide direction into an insert receiver,
the dovetail section including two reference surfaces, which are arranged on opposite sides of the dovetail section (and hence also of the cutting insert) and lying in a common reference plane;
the dovetail section including a first guide surface and a second guide surface,
the reference surfaces, the first guide surface and the second guide surface running parallel to the guide direction,
the first guide surface and a first of the reference surfaces, in the region outside the cutting insert forming a first guide angle,
the second guide surface and a second of the reference surfaces, in the region outside the cutting insert forming a second guide angle,
wherein the first and the second guide angle are acute angles and differ, in particular by at least 3° or at least 5°.

By way of the reference surfaces, the first guide surface and the second guide surface running parallel to the guide direction, they form a guide of the cutting insert in the guide direction. Expressed differently, the reference surfaces, the first guide surface and the second guide surfaces each form a limitation of the movement of the cutting insert in a respective direction orthogonal to the guide direction. When the cutting insert is inserted in the insert receiver—disregarding a small play which is necessary for the sliding seat—these surfaces together do not permit a movement of the cutting insert in directions orthogonal to the guide direction. They therefore limit its movement to a linear movement along the guide direction.

In embodiments, with respect to a cutting direction (or working direction) of the cutting edge, the leading of the two guide angles is the larger one.

In embodiments, the first acute angle is 65° and the second acute angle is 70°.

The cutting edge—with the leading cut portion and with the guide portion—extends in a cutting direction, and the reference surfaces form a stop of the cutting insert in a direction that runs essentially parallel to the cutting direction.

The cutting insert is provided for movement in a moment direction. On assembly of the cutting insert in a corresponding annular body, the movement direction runs in a plane normal to the rotation axis of the annular body. The cutting direction is normal to the movement direction or oblique to the normal to the movement direction, with an angle to the normal of for example less than ±30°, in particular between 5° and 25° in both directions.

In embodiments, the length of the cutting insert is between 12 and 50 mm and the length of the insert receiver is between 8 and 49 mm.

In embodiments, the length of the cutting insert is between 15 and 40 mm, and the length of the insert receiver is between 10 and 39 mm.

In embodiments, the length of the cutting insert is between 20 and 30 mm, and the length of the insert receiver is between 15 and 29 mm.

In embodiments, the height of the cutting insert—i.e. its extension in the direction normal to the movement direction—is between 20 and 30 mm, in particular between 4 and 20 mm, in particular between 6 and 15 mm.

The base body serves for use in a machine reaming tool, and includes insert receivers that each form linear guides for receiving cutting inserts in a direction orthogonal to a rotation axis of the machine reaming tool.

According to an aspect of the invention, the base body includes a coolant feed in which the coolant is led through the nozzle body, wherein the nozzle body is a rotationally symmetrical part with respect to a rotation axis, with a notch that runs in the circumferential direction around the nozzle body. This aspect of the base body with nozzle bodies can be realised in combination with the linear guides which have been described above, or independently of these.

Such a base body includes several coolant feeds that are each assigned to an insert receiver, wherein a coolant feed leads through the base body to a nozzle receiver, a spray channel leads from the nozzle receiver in the direction of the assigned insert receiver, and a nozzle body is inserted into the nozzle receiver, the nozzle body including a notch, which runs in the circumferential direction around the nozzle body, and a circumferential flank of the notch defines a jet direction of a coolant jet, which is fed through the coolant feed.

Herein, an outer flank of the notch, in a sectioned view along a plane that includes the rotation axis, can have an angle or flank angle with respect to the rotation axis, which defines a jet direction of the coolant. The angle of the coolant jet with respect to the rotation axis of the nozzle body can be defined by the flank of the notch, and hence also the angle of the coolant jet with respect to a tangential surface on the periphery of the base body. If the cutting diameter is changed by way of adjusting the cutting inserts, then the coolant jets can be adapted by way of exchanging the nozzle bodies. These nozzle bodies on account of their rotationally symmetrical shape can be manufactured in a simple and inexpensive manner as turned parts.

In embodiments, a base body together with several sets of nozzle bodies is present, wherein the sets of nozzle bodies have different flank angles. In other words, all nozzle bodies of each set have the same flank angle.

A method for providing a machine reaming tool with a predefined cutting dimension includes the steps of:
- grinding a set of cutting inserts to a reference diameter, for example to 140 mm;
- in accordance with the predefined cutting dimension, wherein the cutting dimension differs from the reference diameter, selecting a base body from a series of base bodies with different diameters;
- inserting the ground cutting inserts into the base body and adjusting the position of the cutting inserts in the respective insert receivers in accordance with the cutting dimension, in particular by way of a stop unit of the respective insert receiver.

The cutting dimension corresponds to the diameter, to which the bore is brought by way of the machining with the machine reaming tool. Herewith, it is possible on the one hand to manufacture sets of cutting inserts in large piece numbers and with a high accuracy, and on the other hand to adapt a set to a desired cutting dimension with little effort.

BRIEF DESCRIPTION OF THE DRAWINGS

Hereinafter, the subject-matter of the invention is explained in more detail by way of preferred embodiment examples which are represented in the accompanying drawings. There are shown schematically in:
FIGS. 1-3 a machine reaming tool in different views;
FIGS. 4-5 a cutting insert;
FIG. 6 a section through a cutting insert in the annular body;
FIG. 7 a clamping body;
FIGS. 8-9 a clamping nut;
FIG. 10 a section through a receiver for a cutting insert;
FIG. 11 a corresponding view;
FIGS. 12-13 a nozzle body.

DETAILED DESCRIPTION OF THE INVENTION

Figure 14:
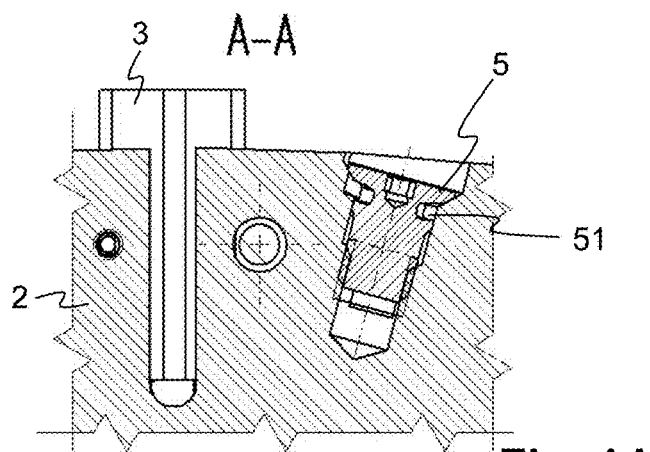
FIGS. 14-19 a variant of the nozzle body.

Basically, in the figures the same parts or equally acting parts are provided with the same reference numerals.

FIGS. 1-3 shows a machine reaming tool 1 in different views. The machine reaming tool 1 includes an annular base body 2, into which cutting inserts 3 are inserted in a manner distributed about the periphery. Typically, this distribution is not completely uniform, in order to avoid vibrations of the tool. The cutting inserts 3 are each inserted into insert receivers 24 and with these form a linear guide or a straight guide for the linear displacement of the cutting inserts 3 with respect to the insert receivers 24. The guide in particular is a dovetail guidance, which can also be denoted as a closed prismatic sliding guide.

The cutting inserts 3 each include a cutting edge 36 with a comparatively short leading cut portion and a longer guide portion.

The base body 2 is rotationally symmetrical with respect to a rotation axis, and is envisaged for assembly on a machine tool for the rotation about this rotation axis. The insert receivers 24 and the cutting inserts 3 are orientated such that on displacing the cutting inserts 3 in the guide, the cutting edges 36 displace with respect to the machine reaming tool 1 in the radial direction, thus along a line that leads through the rotation axis of the machine reaming tool 1.

An axial surface of the base body 2 serves as a reference surface 23 for the position of the cutting inserts 3 in the axial direction. For this, the reference surface 23 can be ground in a plane manner according to the necessary precision.

An adjusting screw 25 is assigned to each cutting insert 3, said adjusting screw limiting the position of the cutting insert 3 to the inside in the radial direction with respect to the base body 2, or in the longitudinal direction with respect to the cutting insert 3. The adjusting screw 25 runs in the radial direction and can be adjusted from the inner side of the base body 2, through an opening in its cylindrical inner surface.

A coolant feed, which leads coolant through a nozzle body 5 and a spray channel 28 to the respective cutting edge 36, is assigned to each cutting insert 3.

FIGS. 4-5 show a cutting insert 3 with parts which are relevant for the guiding. The cutting edge 36 is not represented for the sake of simplicity. The cutting insert 3 includes a dovetail section 34 with the surfaces that are of relevance to the dovetail guidance as a prismatic sliding guide. These are a first guide surface 31, which merges into a first reference surface 33*a*, and a second guide surface 32, which merges into a second reference surface 33*b*. All these surfaces are planar and each run parallel to a longitudinal axis of the cutting insert 3. The longitudinal axis is parallel to or coincides with the guidance direction. An acute angle, hereinafter also denoted as a guide angle, lies between the guide surfaces and the respective reference surface—outside the cutting insert. A recess 35 is arranged on one side of the dovetail section 34.

FIG. 6 shows a section through a cutting insert 3 in the annular body 2. In the assembled state of a cutting insert 3 in the base body 2, the following geometric relations or definitions apply:

The reference surface 23 of the base body 2 and the reference surfaces 33*a*, 33*b* of the cutting insert 3 bear on one another and lie in a common reference plane.

The first receiving surface 21 and the first guide surface 31 bear on one another and lie in a first reference plane. The angle between the first guide plane and the reference plane is hereinafter denoted as the first guide angle.

The second receiving surface 22 and the second guide surface 32 bear on one another and lie in a second guide plane. The angle between the second guide plane and the reference plane is hereinafter denoted as the second guide angle.

The reference plane lie normally to the rotation axis. The first and the second guide plane each lie at an angle (guide angle) to the reference plane. In embodiments, this angle is between 45° and 85°, in particular between 50° and 80°, in particular between 55° and 75°.

A clamping body 4 is present additionally to the cutting insert 3; see also FIG. 7, with a clamping section 41 that is pressed against the second guide surface 32. The corresponding force is mustered by a clamping nut 43, which is screwed to a threaded section 42 of the clamping body 4. The clamping nut 43, see also FIGS. 8 and 9, includes a cone section 44, which is arranged in a conical receiver or a conical seat 29 of the base body 2. The conical shape of the clamping nut 43 on the one hand permits the threaded section between the clamping nut 43 and the clamping body 4 to be designed sufficiently long for the necessary clamping force, and on the other hand permits the base body 2 not to be weakened too much in the region of the insert receiver 24. The cone angle in the cone section 44 is for example 45°.

The clamping nut 43 pulls the clamping body 4 in the axial direction of the base body 2, and since the second guide surface 32 and the clamping section 41 are plane and bear on one another and lie in a plane that runs obliquely to the axial direction in accordance with the second guide angle, the clamping section 41 exerts a clamping force upon the cutting insert 3, said clamping force having an axial component as well as a component in the peripheral direction with respect to the base body 2 or orthogonally to the guide direction of the cutting insert 3.

This clamping force leads to the first reference surface 33*a* and the second reference surface 33*b* of the cutting insert 3 being pressed against the reference surface 23 of the base body 2, and the first guide surface 31 being pressed against the first receiving surface 21. Herewith, the position of the cutting insert 3 in the base body 2 is defined with respect to five degrees of freedom. The sixth degree of freedom corresponds to the displaceability in the guiding direction.

FIG. 6 further shows a threaded pin 6 that is inserted into the base body 2, in particular screwed into it, and in the region of the recess 35 overlaps the cross section of the cutting insert 3. The recess 35 is elongate, so that the cutting insert 3 can be displaced in the guiding direction, without the threaded pin 6 being affected. The threaded pin 6 serves as a loss protection or a securing against being flung away, in the case that the clamping force should ease.

FIG. 10 shows a section through an insert receiver 24 for a cutting inset, and FIG. 11 shows a corresponding view upon a detail of the base body 2 in the region of this insert receiver 24. It is only the base body 2 that is represented. The inclination of the first receiving surface 21 and of the second receiving surface 22 is differently large here. In particular, the first guide angle is 65° and the second guide angle 70°. By way of the second guide angle being larger than the first, the pressing force on the second reference surface 33*b* and the pressing force on the first reference surface 33*a* can approximate one another. If the angles are equally large, then the pressing force on the first reference surface 33*a* is smaller, typically due to the geometry of the guide and due to friction between the clamping section 41 of the clamping body 4 and the second guide surface 32. By way of the second guide angle, thus the angle at which the clamping body 4 engages, being enlarged with respect to the first guide angle, the pressing force between the first reference surface 33*a* and the reference surface 23 of the base body 2 is increased.

By way of the two pressing forces on the two reference surfaces 33 being approximated to one another, the precision of the contact of the cutting insert 3 on the reference surface 23 is increased.

FIGS. 12-13 show a nozzle body 5. This is inserted into a nozzle receiver 27 of the base body 2 (see FIG. 11). It can be fastened in the base body by a screw 53 (see FIG. 3). The nozzle body 5 includes a circumferential notch 51. The nozzle receiver 27 includes a recess through which coolant flows from a coolant feed 26 from the inside of the base body 2 into the notch 51. The coolant can only leave the notch 51 in the region of a spray channel 51. The spray channel 28 is a notch or a recess in the base body 2 which represents an opening of the cavity which is formed by the notch 51. This opening is aligned to the cutting edge 36. With respect to the axis of symmetry of the nozzle body 5, the spray channel 28 defines the direction of the coolant jet along the periphery of the nozzle body 5. A flank angle 52 of a flank of the notch 51 defines the angle between the coolant jet and the axis of symmetry.

If the position of the cutting edge 36 is adjusted by way of displacing the cutting insert 3, then the coolant jet can be set to a new length by way of the nozzle body 5 being replaced by a nozzle body 5 with a different flank angle 52. Since the nozzle bodies 5 are designed as rotationally symmetrical parts, they are simple and inexpensive to manufacture. Herewith, an inexpensive adaptation of the coolant feed to the adjustable position of the cutting inserts 3 is possible.

The flank angle 52, as a deviation of the alignment of the flank from a tangent plane onto the periphery of the base body 2 at the location of the nozzle body 5, is for example between 1° and 45°, in particular between 5° and 35°, in particular between 10° and 30°.

Figure 15:
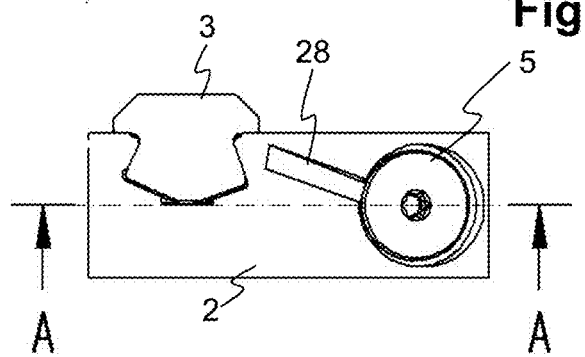
Figure 16:
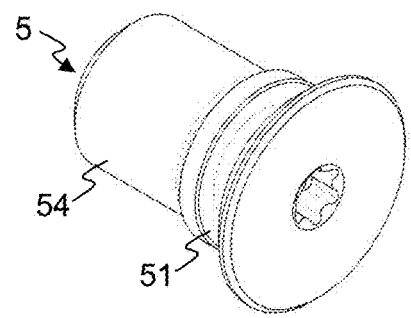
Figure 17:
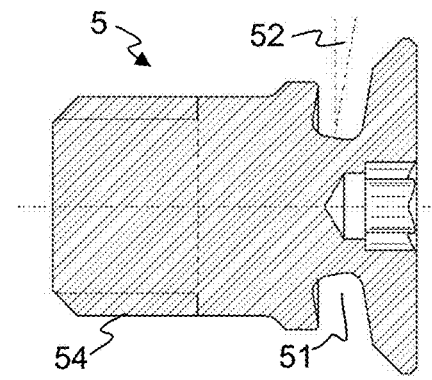
Figure 18:
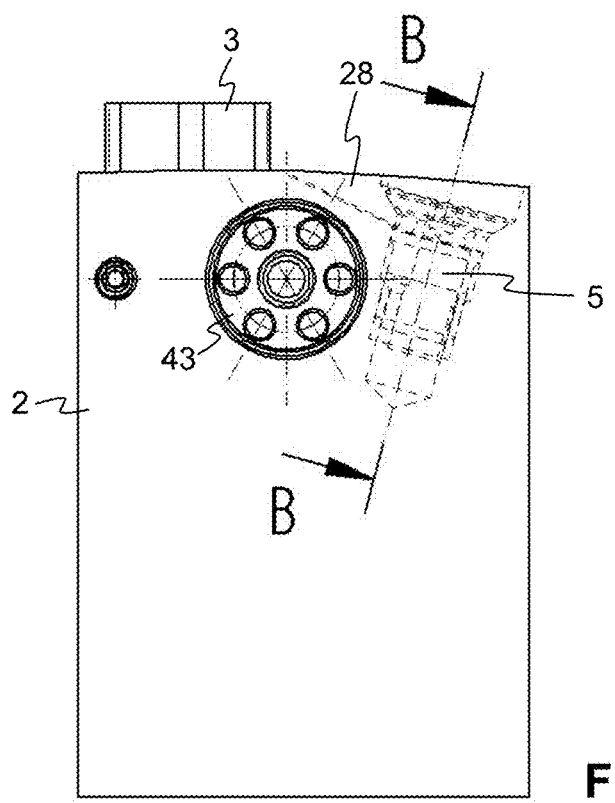
Figure 19:
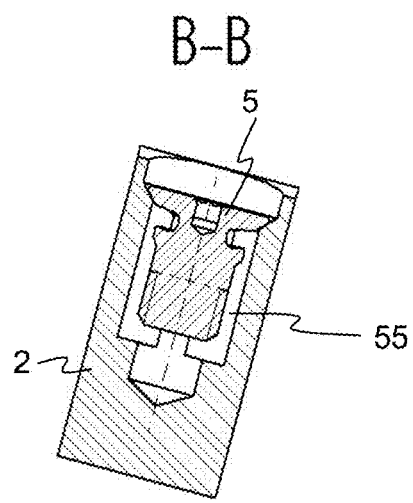

FIGS. 14-19 show a variant of the nozzle body 5 in the individual views as well as in the assembled state in different views and sections. In contrast to the nozzle body 5 of the preceding figures which is fastened by a screw 53, this nozzle body 5 itself includes a threaded section 54 with which it is screwed into a corresponding inner thread of the base body 2. This inner thread is interrupted by at least one recess 55 that runs parallel to the axis of the thread and forms a channel for the feed of coolant to the notch 51. Alternatively (not represented) or additionally, the threaded section 54 can include recesses in the axial direction to the coolant feed.

The invention claimed is:

1. A machine reaming tool, comprising a base body with a plurality of insert receivers, and cutting inserts;
   wherein the cutting inserts are inserted into the insert receivers,
   wherein the insert receivers form linear guides for guiding the cutting inserts in a linear direction orthogonal to a rotation axis of the machine reaming tool when the cutting inserts are inserted into the insert receivers;
   wherein the linear guides each have a dovetail shape; and
   wherein each of the cutting inserts includes a dovetail shaped section, which corresponds and interacts with the dovetail shape of the insert receivers for guiding the cutting inserts in the linear direction when then cutting inserts are inserted into the insert receivers.

2. The machine reaming tool according to claim 1, wherein the dovetail shape is formed by a first receiving surface and a second receiving surface of the base body.

3. The machine reaming tool according to claim 2, wherein the dovetail shape is designed asymmetrically.

4. The machine reaming tool according to claim 3, wherein an angle between the first guide surface with respect to a reference plane, which runs orthogonally to the rotation axis of the machine reaming tool, is 65°, and an angle between the second guide surface and the reference plane is 70°.

5. The machine reaming tool according to claim 4, wherein the clamping body and the second receiving surface lead with respect to the cutting insert seen in the rotation direction during use of the machine reaming tool.

6. The machine reaming tool according to claim 2,
   wherein the machine reaming tool comprises a clamping body which interacts with the second receiving surface and herein exerts a force which presses the first guide surface against the first receiving surface,
   and the force also presses a first and a second reference surface of the cutting insert against a reference surface of the base body,
   wherein the reference surfaces lie orthogonally to the rotation axis of the machine reaming tool.

7. The machine reaming tool according to claim 6, further including a clamping nut which interacts with a threaded section of the clamping body and exerts the force which presses the first receiving surface against the first guide surface,
   wherein the clamping nut comprises a cone section, and with the cone section is arranged in a conical seat of the base body.

8. The machine reaming tool according to claim 3, wherein the dovetail shape is designed asymmetrically by way of an angle between the first guide surface with respect to a reference plane, which runs orthogonally to the rotation axis of the machine reaming tool, differing from an angle between the second guide surface and the reference plane by at least 3°.

9. The machine reaming tool according to claim 1, wherein an insert receiver comprises a stop unit which effects an adjustable limitation of the movement of the cutting insert which is inserted into the insert receiver, in the direction of the linear guide,
   wherein the stop unit comprises an adjusting screw that is adjustable in the direction of the linear guide,
   wherein the adjusting screw permits the adjustment of the position of the cutting insert in the range of up to ten millimeters.

10. The machine reaming tool according to claim 1, wherein the base body has an outer diameter of between 120 and 300 millimeters.

11. A cutting insert for use in a machine reaming tool according to claim 1, comprising a cutting edge for reaming a workpiece, and a dovetail shaped section for guiding of the cutting insert via the linear guide of the machine reaming tool during insertion of the cutting insert into an insert receiver of the machine reaming tool, wherein the dovetail section is designed asymmetrically, by way of:
   the cutting insert extending in a guide direction, and being provided for inserting along the guide direction into the insert receiver,
   the dovetail section comprising two reference surfaces which are arranged on opposite sides of the dovetail section and lie in a common reference plane;
   the dovetail section comprising a first guide surface and a second guide surface,
   the reference surfaces, the first guide surface and the second guide surface running parallel to the guide direction,
   the first guide surface and a first of the reference surfaces, in a region outside the cutting insert, form a first guide angle,
   the second guide surface and a second of the reference surfaces, in a region outside the cutting insert, form a second guide angle,
   wherein the first and the second guide angle are acute angles and differ by at least 3° or at least 5°.

12. The cutting insert according to claim 11, wherein with respect to a cutting direction of the cutting edge, the leading of the two guide angles is the larger one.

13. The cutting insert according to claim 11, wherein the first acute angle is 65° and the second acute angle is 70°.

14. A base body for use in a machine reaming tool according to claim 1, comprising insert receivers forming linear guides for guiding cutting inserts in a linear direction orthogonal to a rotation axis of the machine reaming tool when the cutting inserts are inserted into the insert receivers;
   wherein the linear guides each have a dovetail shape; and
   wherein each of the cutting inserts includes a dovetail shaped section, which corresponds and interacts with the dovetail shape of the insert receivers for guiding the cutting inserts in the linear direction when then cutting inserts are inserted into the insert receivers.

15. The base body according to claim 14, comprising several coolant feeds which are each assigned to an insert receiver, wherein a coolant feed leads through the base body to a nozzle receiver, a spray channel leads from the nozzle receiver in the direction of the assigned insert receiver, and a nozzle body is inserted into the nozzle receiver, said nozzle body comprising a notch which runs in the circumferential direction around the nozzle body, and a circumferential flank of the notch defines a jet direction of a coolant jet which is fed through the coolant feed.

* * * * *